Nov. 3, 1964   L. L. FINCANNON   3,155,258
MATERIAL HANDLING APPARATUS
Filed Oct. 5, 1961
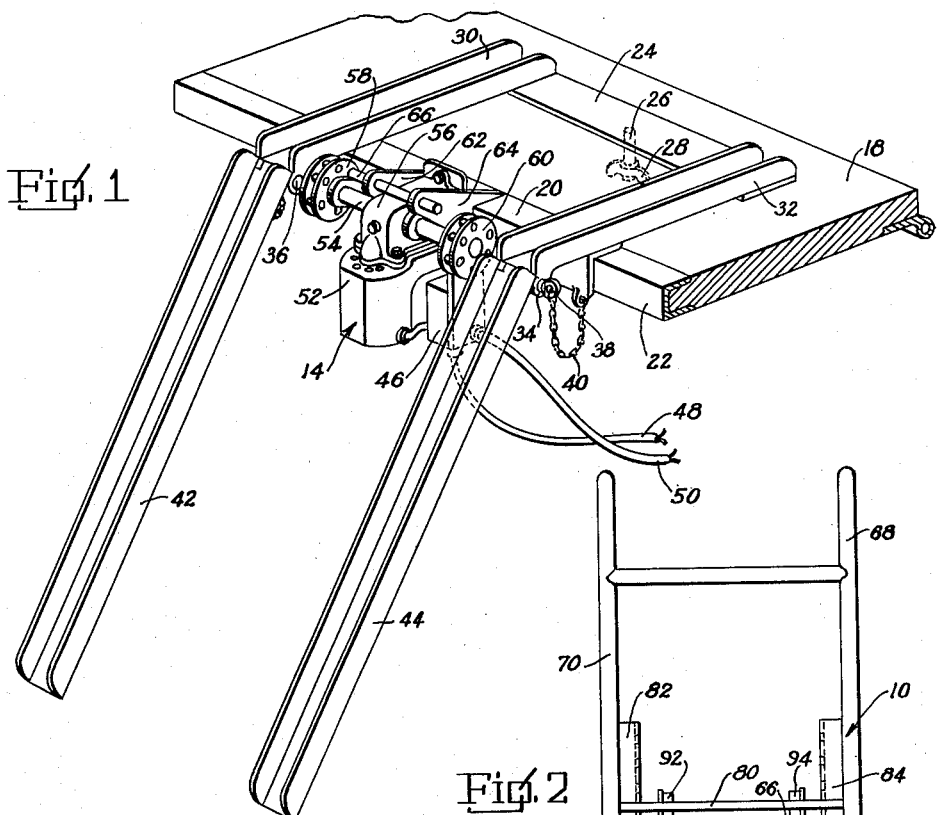
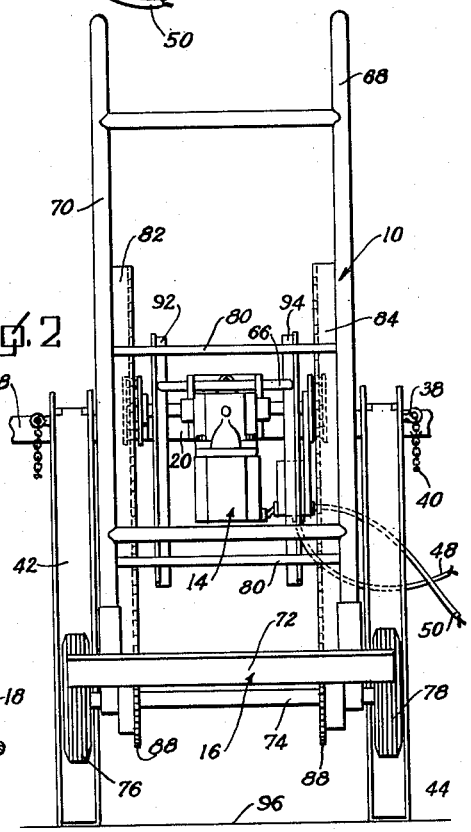
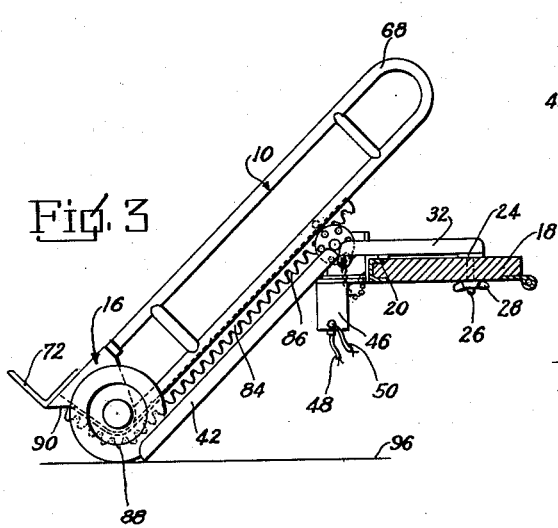
INVENTOR.
Lee L. Fincannon
BY
William S. Dorman
ATTY.

United States Patent Office 3,155,258
Patented Nov. 3, 1964

3,155,258
MATERIAL HANDLING APPARATUS
Lee L. Fincannon, 1116 South 77th East Ave., Tulsa, Okla., assignor of one-sixth to William L. Riggs and of one-sixth to Charles Christ, both of Tulsa, Okla.
Filed Oct. 5, 1961, Ser. No. 143,186
9 Claims. (Cl. 214—515)

This invention relates to improvements in hand trucks for material handling, and more particularly, but not by way of limitation, to a hand truck particularly designed and constructed for facilitating the loading and unloading of material onto a vehicle by an individual or single operator.

The loading and unloading of bulky or heavy merchandise such as home appliances, packing cases, or the like, for delivery to a consumer present many problems. The weight and size of the material is frequently sufficiently great that at least two persons are required for handling of the merchandise in order to elevate the item to the bed of the vehicle. This is a particular disadvantage for the delivery of merchandise from a relatively small business establishment in that it may be that only one delivery person is available for each operation. Furthermore, the handling of the merchandise during the loading or unloading thereof from the delivery vehicle may result in injury to the personnel handling the operation. Many types of devices have been developed in an effort to overcome the inherent disadvantages of the handling and delivery of large and heavy materials, such as the well known fork-lift truck, tail gate lift, conveyor devices, or the like. However, these devices are expensive to purchase and maintain, and many relatively small business establishments frequently cannot afford this type of equipment.

The present invention contemplates a novel material handling device wherein substantially any material, such as a refrigerator, stove, case of merchandise, or the like, may be quickly and easily loaded or unloaded from the bed of a delivery vehicle by a single or individual operator. The novel apparatus comprises a rail and drive mechanism in combination with a hand truck device for handling the material. The rail and drive mechanism may be secured to the tail gate portion of substantially any type vehicle or delivery truck whereby one of the novel material handling devices may be utilized with a plurality of vehicles. The hand truck is provided with a novel rack member or engagement with the drive mechanism whereby the entire cart or hand truck having the merchandise disposed thereon may be readily loaded or unloaded from the carrying bed of the truck. The drive mechanism is power driven and may be actuated by remote control from a suitable hand control or switch mechanism in order to move the hand truck upwardly or downwardly with respect to the vehicle in accordance with the delivery operation to be performed. A locking device cooperates between the rail structure and the hand truck for precluding accidental dislodging or forward tipping of the hand truck during the lifting or lowering thereof, thus providing a safety feature for the overall apparatus. The entire loading and unloading operation may be easily accomplished by an individual operator and the possibility of injury to the operating personnel is greatly reduced or substantially eliminated.

It is an important object of this invention to provide a novel material handling apparatus for facilitating the loading and unloading of materials onto a delivery vehicle, or the like, with a minimum of operating personnel.

It is another object of this invention to provide a novel material handling apparatus wherein merchandise may be readily loaded or unloaded from a vehicle in a manner greatly reducing the possibility of personal injury to the operator thereof.

Another object of this invention is to provide a novel material handling apparatus wherein a single unit may be readily adapted for utilization with a plurality of vehicles.

Still another object of this invention is to provide a novel material handling apparatus provided with a locking device for purposes of safety to both the personnel and merchandise during utilization thereof.

A further object of this invention is to provide a novel material handling apparatus adapted for actuation by remote control by an individual or single operator.

It is still another object of this invention to provide a novel material handling apparatus comprising a complementary drive and rack mechanism to provide a positive control of the elevating and lowering operation during the handling of the merchandise.

Other objects and advantages of the invention will be evident from the following detailed description, read in conjunction with the accompanying drawings, which illustrate my invention.

In the drawings:

FIGURE 1 is a perspective view of a drive assembly embodying the invention and secured to the tail gate portion of a vehicle.

FIGURE 2 is a rear elevational view of a material handling apparatus embodying the invention secured to a portion of a vehicle.

FIGURE 3 is a side elevational view of a material handling apparatus embodying the invention secured to the tail gate of a vehicle and with portions thereof depicted in section for purposes of illustration.

Referring to the drawings in detail, reference character 10 generally indicates a material handling apparatus comprising a drive mechanism 14 and a cart or hand truck device 16. The drive mechanism 14 is adapted to be removably secured to substantially any suitable vehicle (not shown), and as depicted herein secured to the tail gate member 18 of a delivery vehicle in a manner as will be hereinafter set forth. The drive mechanism 14 comprises a forwardly disposed support member 20, preferably constructed of an angle member, or the like, but not limited thereto, and adapted for disposition adjacent the forward end 22 of the tail gate 18. A second support member 24 is spaced rearwardly from the support member 20, as clearly shown in FIG. 1, and is provided with a stud member 26 projecting from the lower surface thereof for extending through an aperture (not shown) provided in the tail gate 18. The outer extremity of the stud 26 may be threaded, if desired, for receiving a suitable wing nut or locking member 28, or the like, for securing the plate or support member 24 to the tail gate 18.

A pair of substantially parallel spaced channel members 30 and 32 are disposed between the support members 20 and 24 and may be rigidly secured thereto in any suitable manner, such as by welding, or the like. The channel members 30 and 32 are preferably substantially identical and provide rails for operation of the apparatus 10, as will be hereinafter set forth. Each rail member 30 and 32 extends slightly beyond the outer end 22 of the tail gate 18, as shown in FIG. 1, and each is provided with downwardly extending lug members 34 having aligned apertures 36 therein for receiving a locking stud 38 therethrough. The locking studs 38 are preferably secured to the support member 20 by means of a chain 40, or the like, for precluding accidental loss thereof. A pair of complementary channel members 42 and 44 are removably secured to the rail members 30 and 32, respectively, by means of suitable apertured lugs (not shown), or the like, whereby the locking studs 38 may be inserted therethrough for hingedly connecting the channels 42 and 44 with the respective rails. The channels 42 and 44 preferably extend downwardly from the rails 30 and 32 at an angle and cooperate therewith to provide rails or a ramp from the ground level onto the upper surface of the tail gate 18.

The drive mechanism 14 is further provided with a motor 46 which may be of any suitable type, either alternating current or direct current, as desired, and is provided with the usual connection or electrical conduit 48 for connection with the battery (not shown) of the vehicle, or with the electrical circuit of a building or house (not shown). A second electrical conduit 50 is provided for connecting the motor 46 with a suitable hand switch or control box mechanism (not shown) whereby the operation of the motor 46 may be controlled in the well known manner. It is preferable that the hand control device be of the type for starting and stopping the operation of the motor in response to manually actuated switches, and for reversing the direction of rotation thereof for a purpose as will be hereinafter set forth.

The motor 46 is suitably connected with a gear reduction unit, generally indicated at 52, which in turn drives a shaft 54 through a suitable gearing arrangement (not shown) housed within a casing 56. The casing 56 may be secured to the support member 20 in any well known manner whereby the gear reduction unit 52 and motor 46 are carried thereby as an integral unit. It will be apparent that the shaft 54 may be a single continuous rod extending through the casing 56 and journalled therein for rotation, or may be a pair of axially aligned shafts journalled in the casing 56 and extending outwardly therefrom. A pair of drive wheels, or sprockets 58 and 60 are keyed or otherwise secured to the opposite ends of the shaft 54 for simultaneous rotation therewith. The sprockets 58 and 60 may be considered as a cableless winch and function to elevate and lower the hand truck 16 with respect to the tail gate 18 in a manner as will be hereinafter set forth.

A pair of spaced outwardly extending bracket members 62 and 64 are rigidly secured to the support member 20 in any well known manner for supporting a safety locking bar 66. The locking bar 66 is preferably rigidly secured between the brackets 62 and 64 and projects outwardly from the opposite sides thereof for engaging the hand truck 16 during the elevating and lowering operation whereby accidental loss of the hand truck or dropping thereof is precluded.

The hand truck 16 may be of any well known type and as depicted herein comprises a pair of spaced side frame members 68 and 70 having a load supporting member 72 extending transversely therebetween in the proximity of the lower end thereof. A suitable axle member 74 is journalled between the side bar or frame members 68 and 70 in any suitable manner for receiving a pair of wheels 76 and 78 on the opposite ends thereof. A plurality of transversely extending spaced strengthening rods 80 are secured between the side bar members 68 and 70 for rigidity and to provide a merchandise supporting surface, as is well known. The ramp or rails 42 and 44 of the drive mechanism portion 14 are preferably spaced in accordance with the distance between the tires or wheels 76 and 78 in order that the wheels may be disposed on the rails during the operation of the apparatus 10.

A pair of substantially identical rack members 82 and 84 are rigidly secured to the rear of the side rail members 68 and 70, respectively. Each rack 82 and 84 is provided with a plurality of longitudinally extending teeth or recess portions 86, as is well known, for engaging the sprockets 58 and 60 during operation of the apparatus 10. Each rack 82 and 84 is provided with a curved portion at 88, as shown in dotted lines in FIG. 3, whereby the racks extend from the rear of the side bar members 68 and 70, around the axle 74 and to a position adjacent the support angle 72. Each rack 82 and 84 terminates adjacent the support angle 72 with a recess 90 of angular configuration to provide a stop means.

A pair of L-shaped brackets or flanges 92 and 94 are secured to the rear of the bars 80 and are inwardly directed and so spaced to engage the opposed free ends of the safety bar or rod 66 during the raising and lowering of the hand truck 16 with respect to the tail gate 18 during the operation of the apparatus 10.

*Operation*

When it is desired to deliver merchandise to a consumer, such as a refrigerator, or the like (not shown), the hand truck or cart 16 may be manually wheeled or rolled on the wheels 76 and 78 in the usual manner of such vehicles. The hand truck may be disposed in a substantially upright or vertical position wherein the merchandise support angle 72 is disposed on the ground or floor level indicated at 96 in FIG. 3. In this position, the merchandise to be loaded thereon may be more easily handled in that the member 72 may be moved to a position beneath the refrigerator, or the like, as is well known. The hand truck 16 may then be manually pivoted in a rearward direction about the axle 74 in order to position the refrigerator, or other merchandise, adjacent the bars 80. In this manner, the refrigerator will be loaded onto the hand truck 16 with the lower end thereof supported on the support angle 72 and the back, or front thereof supported on the transverse rods 80. Of course, safety straps, or the like (not shown), may be secured around the merchandise and the hand truck 16 for securely tying or retaining the merchandise thereto, if desired. The loaded hand truck 16 may then be manually moved or rolled on the wheels 76 and 78 in the usual manner to the vicinity of the delivery vehicle.

The wheels of the hand truck 16 are disposed in alignment with the open lower end of the rail members 42 and 44 of the drive mechanism 14. When the wheels are thus aligned with the rails 42 and 44, the side frames 68 and 70 may be manually lowered in a direction toward the tail gate 18 whereupon the rack members 82 and 84 will be brought into engagement with the respective drive wheels 58 and 60. As hereinbefore set forth, the teeth 86 of each rack will engage the sprockets 58 and 60. The operator of the delivery vehicle, or the person handling the loading thereof, may then actuate the hand control device (not shown) for starting the motor 46 in the forward directon. The motor 46 drives the gear reduction unit 52 which in turn transmits rotation to the shaft 54 for simultaneously turning the sprockets 58 and 60 in a forward direction. The rotation of the sprockets causes the rack members 82 and 84 engaged therewith to move upwardly for elevating the hand truck 16 with respect to the tail gate 18. During the upward movement of the hand truck, the wheels 76 and 78 ride smoothly and easily in the rails 42 and 44, and the hand truck 16 moves in a combined upward and rearward direction until the wheels approach the rails 30 and 32.

The safety flanges 92 and 94 are so positioned on the transverse bars 80 that substantially immediately upon the start of the upward and rearward movement of the hand truck 16 on the rails 42 and 44, the flanges engage the opposed outer ends of the rod 66 to positively lock the hand truck 16 to the drive mechanism 14. During the upward and rearward movement of the hand truck, the flanges 92 and 94 move simultaneously therewith and ride along the rod 66 to assure that there will be no accidental forward tipping or movement of the hand truck from the drive mechanism, thus providing a safety feature during the operation of the apparatus 10.

As the wheels 76 and 78 approach the upper rails 30 and 32, the curved portion 88 of the racks 82 and 84 approach the drive sprockets 58 and 60. The continued upward movement of the hand truck 16 brings the curved portion 88 into engagement with the sprockets 58 and 60, and the engagement therebetween functions to push the wheels 76 and 78 onto and along the rails 30 and 32 whereby the hand truck 16 may be disposed on the tail gate 18. When the cart or hand truck 16 is moved upwardly and rearwardly on the ramp or rails 42 and 44, the side frame members 68 and 70 are normally disposed at an angle with respect to the vertical, whereby gravity facilitates the holding of the merchandise on the cart 16. When the curved portions 88 of the racks 84 initially engage the sprockets 58 and 60, the curved configuration thereof functions to drive or pivot the cart 16 toward an upright disposition and the wheels 76 and 78 will thus be pulled or pushed onto the rails 30 and 32. In the upright position, the cart 16 may be more easily handled for storage of the material on the vehicle during transportation.

Of course, when the wheels 76 and 78 reach the rails 30 and 32, the flanges or brackets 92 and 94 disengage the bar 66 whereby the curved portion 88 may push the hand truck 16 rearwardly onto the rails 30 and 32. When the hand truck 16 is moved rearwardly on the rails 30 and 32 a sufficient distance, the stop members 90 engage the sprocket wheels 58 and 60 for automatically stopping the movement of the truck. At this time, the operator of the apparatus 10 may stop the motor 46 by use of the hand control device.

The hand truck 16 is thus disposed on the tail gate 18 of the delivery vehicle, and securely held in position until the personnel or operator handling the merchandise is free to manually wheel or roll the loaded hand truck 16 onto the bed of the delivery vehicle for transporting to the desired consumer location. Of course, the merchandise may be removed from the cart 16 and stored on the bed of the vehicle for transportation, if desired.

In order to lower or remove the loaded hand truck 16 from the vehicle, the truck may be rolled manually toward the tail gate 18 and into position with the wheels 76 and 78 disposed on the rails 30 and 32. A continued forward movement of the hand truck 16 will roll the wheels on the rails 30 and 32 until the stop members 90 are brought into engagement with the drive sprockets 58 and 60. The engagement between the stop 90 and the sprockets will securely lock the hand truck in position on the rails 30 and 32 whereby the operator of the apparatus 10 may then actuate the motor 46 in a reverse direction by the hand control device. The reverse actuation of the motor 46 results in a reverse rotation for the drive sprockets 58 and 60 whereby the engagement between the sprockets and the racks 82 and 84 pulls the cart or hand truck 16 in a forward direction until the curved portions 88 of the rack are brought into engagement with the sprockets. The engagement of the curved portions 88 with the respective sprocket wheels locks the racks 82 and 84 to the drive sprockets to preclude free wheeling or free rolling of the cart or hand truck down the ramp or rails 42 and 44. Thus, the continued reverse rotation of the gear wheels or sprockets 58 and 60 pulls the hand truck 16 forwardly for moving the wheels 76 and 78 onto the ramps or angularly disposed rails 42 and 44. As the wheels approach the rails 42 and 44, the safety flanges 92 and 94 engage the free ends of the bar 66 for locking the hand truck to the drive mechanism 14. Simultaneously, the curved portions 88 are moved away from the wheels or sprockets 58 and 60 and the racks 82 and 84 are engaged therewith for moving the cart 16 downwardly on the rails 42 and 44.

The brackets 92 and 94 engage the opposed ends of the safety bar 66 at the start of the downward movement of the cart 16. When the hand truck 16 has been moved downwardly a sufficient distance to bring the wheels into contact with the ground level 96, the flanges 92 and 94 are disengaged from the rod 66, and the hand truck may be manually wheeled or rolled to the particular delivery site in the usual manner for this type of hand cart.

As hereinbefore set forth, the drive mechanism 14 may be readily secured to substantially any type of vehicle. The downwardly extending pin or stud 26 may be inserted through an aperture in the bed or tail gate of the vehicle, and securely clamped thereto by the locking members 28. Of course, any number of the carts or hand trucks 16 may be utilized with a single drive mechanism 14, and the drive mechanism 14 may be quickly and easily removed for installation on a plurality of delivery vehicles, or the like.

From the foregoing, it will be apparent that the present invention provides a novel material handling apparatus wherein merchandise may be readily loaded and unloaded from a vehicle. The entire unit may be actuated by an individual operator in a manner greatly reducing the hazards of personal injury thereto. The novel rack and drive sprocket arrangement greatly increases the speed with which the merchandise may be loaded and unloaded, and the safety feature substantially precludes any accidental disengagement of the hand truck device from the drive mechanism. The unit may be utilized with a plurality of vehicles, and is particularly designed and constructed for simplicity of operation.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. A material handling apparatus for loading and unloading material onto a vehicle, and comprising a drive mechanism adapted to be secured to the vehicle, ramp means carried by the drive mechanism and extending from the ground level to the vehicle, cart means independent from the drive mechanism for carrying the material and adapted to travel reciprocally along the ramp means, means provided on the cart means for cooperating with the drive mechanism to provide the reciprocal movement for the cart means and including means cooperating with the drive mechanism for positioning the cart means on the vehicle in an upright position and pushing the cart means onto the vehicle, and means precluding accidental disengagement of the cart means from the drive mechanism.

2. A material handling apparatus for a vehicle and comprising a drive mechanism removably secured to the vehicle, cart means independent from the drive mechanism, ramp means carried by the drive mechanism for guiding the cart means with respect to the vehicle, drive sprocket means provided on the drive mechanism, power means provided on the drive mechanism for actuation of the drive sprocket means, rack means carried by the cart means for engagement with the drive sprocket means for imparting movement of the cart means for reciprocation thereof along the ramp means, said rack means having a curved portion for engaging the drive sprocket means to position the cart means on the vehicle in an upright position and move the cart means rearwardly on the vehicle, flange members carried by the cart means, transversely extending rod means carried by the drive mechanism for engaging the flange members during reciprocation of the cart means for precluding accidental forward tipping thereof during operation of the apparatus.

3. A material handling apparatus for a vehicle and comprising a drive mechanism removably secured to the vehicle, hand truck means independent from the drive mechanism, ramp means carried by the drive mechanism for guiding the hand truck means onto the vehicle, said drive mechanism comprising drive sprocket means and power means for rotation of the drive sprocket means, rack means provided on the hand truck means for engagement with the drive sprocket means whereby the hand truck means may be reciprocally moved along the ramp means, a curved portion provided on the rack means for engaging the drive sprocket means to position the hand truck means in an upright position on the vehicle, and safety means cooperating between the drive mechanism and the hand truck means for precluding accidental forward tipping of the hand truck means during operation of the material handling apparatus.

4. A material handling apparatus for a vehicle having a delivery bed thereon, and comprising drive means removably secured to the delivery bed, ramp means carried by the drive means and extending from the ground level to the bed of the vehicle, cart means independent from the drive means and adapted for reciprocal movement along the ramp means, a plurality of drive sprockets provided on the drive means, power means carried on the drive means for actuation of the drive sprockets to provide alternate forward and reverse rotational directions therefor, a plurality of rack members secured to the cart means for engaging the drive sprocket for movement along the ramp means, said rack members provided with a curved portion adapted to engage the drive sprockets upon sufficient elevation of the cart means on the ramp means for positioning the cart into an upright position and pushing the cart means onto the bed of the delivery vehicle, and safety means cooperating between the cart means and the drive means for precluding accidental forward tipping of the cart means during operation of the apparatus.

5. A material handling apparatus comprising a drive mechanism, ramp means carried by the drive mechanism, rail means in alignment with the ramp means, cart means adapted for reciprocal movement along the ramp means, rack means provided on the cart means for engaging the drive mechanism to provide the reciprocal movement of the cart means along the ramp means, said rack means provided with a curved portion for engaging the drive mechanism upon sufficient elevation of the cart means with respect to the ramp means for pivoting the cart into an upright position and pushing the cart means into the rail means, and safety means cooperating between the drive mechanism and the cart means for precluding accidental forward tipping of the cart means during operation of the apparatus.

6. A material handling apparatus comprising a drive mechanism adapted to be removably secured to a vehicle, cart means for carrying the material to be handled, ramp means for guiding the cart means between the ground level and the bed of the vehicle, drive sprocket means provided on the drive mechanism, power means provided on the drive mechanism and operably connected with the drive sprocket means for actuation thereof in alternate reverse and forward directions of rotation, rack means provided on the cart means for engagement with the drive means for moving the cart means along the ramp means in accordance with the direction of actuation of the drive mechanism, said rack means provided with a curved portion adapted to engage the drive mechanism upon sufficient elevation of the cart means on the ramp means for pushing the cart onto the vehicle, and safety means cooperating between the cart and the drive mechanism for precluding accidental forward tipping of the cart means during operation of the apparatus.

7. In a material handling apparatus, sprocket means removably secured to a vehicle, cart means for carrying the material to be handled, ramp means cooperating with the sprocket means and cart for guiding the cart with respect to the vehicle, power means operably connected with the sprocket means for actuation thereof in alternate forward and reverse drive directions, rack means provided on the cart means for engaging the sprocket means to drive the cart along the ramp means in accordance with the actuation of the sprocket means, said rack means whereby the cart means is positioned on the vehicle in an upright position and pushed onto the vehicle, and safety means cooperating between the sprocket means and the cart means for precluding accidental disengagement of the cart means from the ramp means during movement of the cart therealong.

8. In a material handling apparatus, sprocket means removably secured to a vehicle, cart means for carrying the material to be handled, ramp means cooperating with the sprocket means and cart for guiding the cart with respect to the vehicle, power means operably connected with the sprocket means for actuationg thereof in alternate forward and reverse drive directions, rack means provided on the cart means for engaging the sprocket means to drive the cart along the ramp means in accordance with the actuation of the sprocket means, said rack means provided with curved portions for engagement with the sprocket means in one position of the cart with respect thereto for pushing the cart onto the vehicle, transversely extending rod means provided on the sprocket means, and spaced flange members provided on the cart means for engaging the opposed ends of the rod means during movement of the cart along the ramp means to preclude accidental forward tipping of the cart during operation of the apparatus.

9. A material handling apparatus comprising a remote control drive mechanism, ramp means carried by the drive mechanism, cart means independent from the drive mechanism and adapted for carrying the material to be handled, drive wheel means provided on the drive mechanism, means provided on the cart means for engagement by the drive wheels to move along the ramp means and including means for positioning the cart means in an upright position, and means cooperating between the drive mechanism and the cart means for precluding accidental forward tipping of the cart means during operation of the apparatus.

References Cited in the file of this patent

UNITED STATES PATENTS

| | | |
|---|---|---|
| 717,617 | Quella | Jan. 6, 1903 |
| 2,107,465 | Borggaard | Feb. 8, 1938 |
| 2,414,447 | Cargile | Jan. 21, 1947 |
| 2,659,504 | Kranawetvogel | Nov. 17, 1953 |
| 2,691,450 | Rosenbaum | Oct. 12, 1954 |
| 2,706,569 | Butler | Apr. 19, 1955 |